(12) United States Patent
Kingsley

(10) Patent No.: US 6,244,189 B1
(45) Date of Patent: Jun. 12, 2001

(54) MACHINE GUIDE AND PROPULSION SYSTEM FOR VARIABLE GEOMETRY SURFACE

(75) Inventor: Theodore C Kingsley, E. Granby, CT (US)

(73) Assignee: Magnatech Limited Partnership, Granby, CT (US)

( * ) Notice: Subject to any disclaimer, the term of this patent is extended or adjusted under 35 U.S.C. 154(b) by 0 days.

(21) Appl. No.: 09/127,621

(22) Filed: Aug. 1, 1998

Related U.S. Application Data

(60) Provisional application No. 60/054,673, filed on Aug. 4, 1997.

(51) Int. Cl.[7] .................................................. B61B 13/04
(52) U.S. Cl. ............................................................. 104/119
(58) Field of Search .................................... 104/119, 118, 104/121; 105/141

(56) References Cited

U.S. PATENT DOCUMENTS

| | | | |
|---|---|---|---|
| 3,259,021 | 7/1966 | Appleton et al. | 90/13 |
| 3,456,555 | 7/1969 | Dunlap | 90/12 |
| 3,476,161 | 11/1969 | Dunlap | 144/144 |
| 4,534,689 | 8/1985 | Theurer | 409/296 |
| 4,703,698 | * 11/1987 | Kazlauskas | 104/119 |
| 5,044,844 | 9/1991 | Backhouse | 409/178 |
| 5,070,792 | * 12/1991 | Harris | 104/119 |
| 5,403,133 | 4/1995 | Kim | 409/178 |

* cited by examiner

*Primary Examiner*—S. Joseph Morano
*Assistant Examiner*—Robert J. McCarry, Jr.
(74) *Attorney, Agent, or Firm*—Robert A. Seemann

(57) ABSTRACT

A carriage wheel and track upon which the wheel runs include meshed ridges and grooves oriented longitudinally with the track at the tangency of the wheel with the track, and force urging the track toward the wheel is applied to the track by a counter force roller along a line that passes through the axis of the carriage wheel, through the axis of the counter force roller, and through the tangency of the carriage wheel with the track.

30 Claims, 11 Drawing Sheets

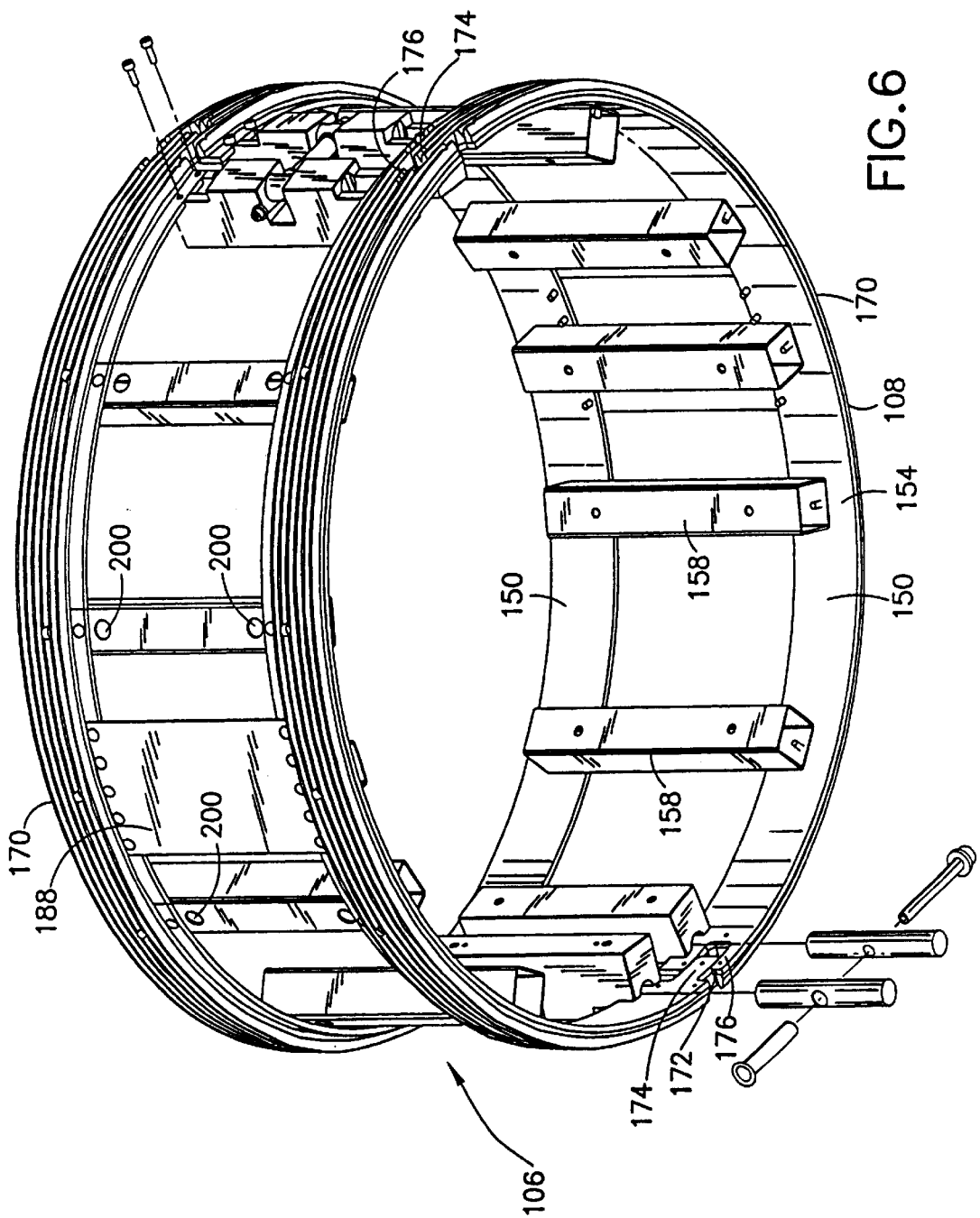

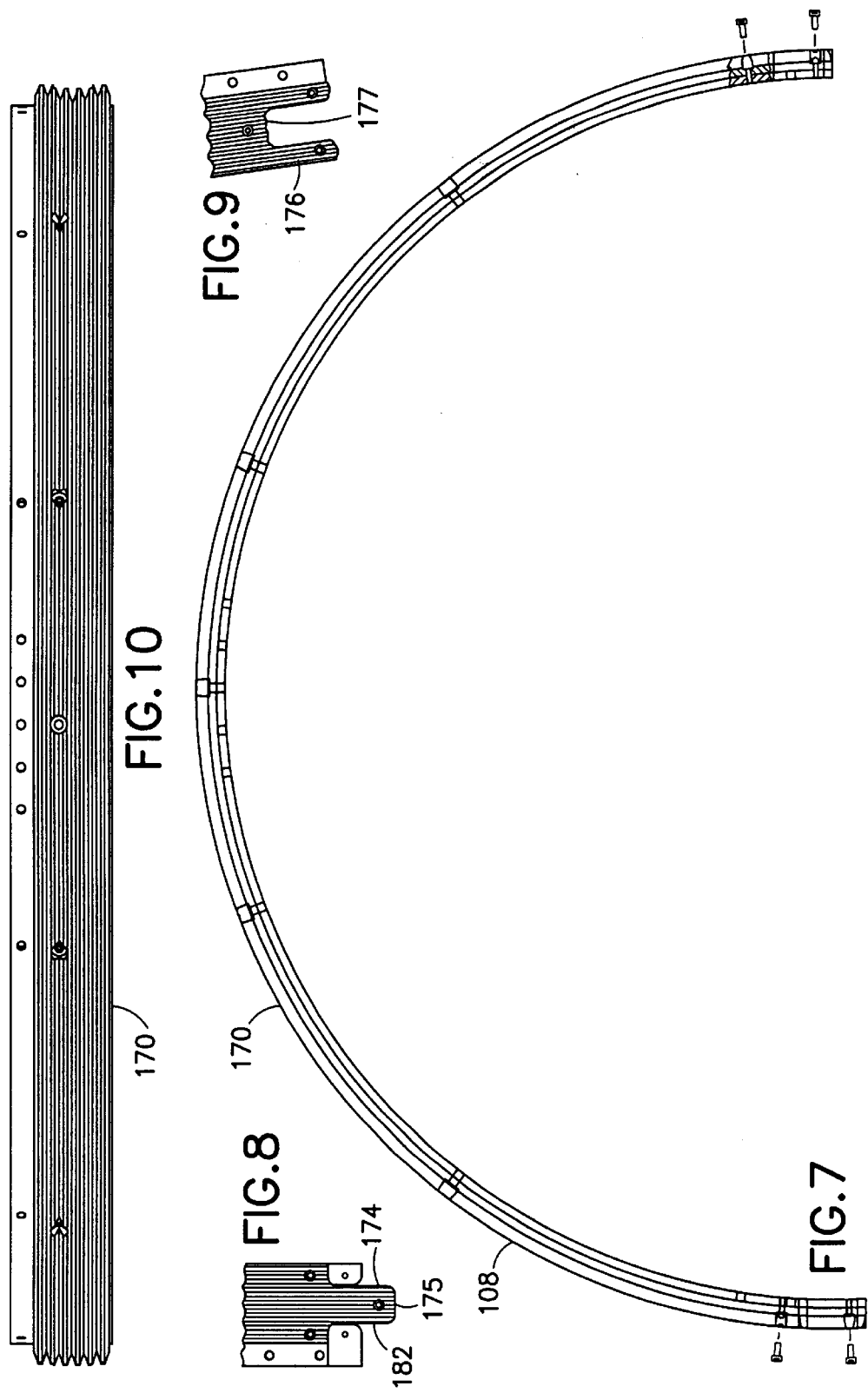

MACHINE GUIDE AND PROPULSION SYSTEM FOR VARIABLE GEOMETRY SURFACE

This application claims the benefit of U.S. Provisional Application No. 60/054,673, filed Aug. 4, 1997.

BACKGROUND OF THE INVENTION

1. Field of the Invention

The invention pertains to guidance systems for tools and machines, more specifically to a tool holder carriage and guidance system which travels over a predetermined course at a predetermined speed over a round, flat, or variable geometry surface precisely and repeatedly.

The term "tool holder carriage" is defined as means for mounting an item, machine or tool on a guide track of the invention for moving along the track, and includes a portion of an item, machine or tool that is adapted to mount on the guide track for moving along the track.

This invention is useful for guiding semi automatic and fully automatic pipe and tube welding tools, and for guiding other tools and machines over the surface of a workpiece.

2. Description of the Prior Art

An essential feature of most orbital welders is a compact welding module containing motors and mechanisms to achieve the various required motions such as arc gap control, oscillation, dwell, wire feed, orbital welding positioning, programming switching, and propulsion.

Accurate placement and speed of propulsion over the workpiece is mandatory to the physics of the welding arc, most commonly in the TIG or MIG processes. Requisite speed control is 0.5% to 3% of programmed speed.

It has been traditional in the prior art to employ a propulsion technique for the tool holder or welder holder that is based upon a device which is dependent upon closely toleranced pitch length such as the pitch length of a gear pitch or roller chain. This pitch-based design works for pipes of selected diameter but carries a heavy penalty of ancillary economic limitations. For example, the pitch length of a gear rack propulsion track must relate to the diameter of the geared drive wheel which rides the track in an exact multiple of the unit pitch of the propulsion unit so that the teeth of the gear and teeth on the track mesh. If the necessary matching length of the track is not compatible with the diameter circumference of the workpiece, then adjustable structures to bridge the gap between the track and workpiece must be provided.

The gear teeth are transverse to the direction of propulsion and do not prevent lateral slippage between the tool holder drive couple of wheel and rack. A separate guide track and idler follower are added to control lateral slippage, adding cost to the arrangement.

The adjustable features are further complicated if the diameter of the workpiece involves many critical tolerances. The necessity for adjustable structures raises the possibility that the annulus between the track and the workpiece may go out of concentricity and complicate the weldment. The need to provide a stiff structure to stabilize the chain pitches or the gear rack closely toleranced tooth geometry, and a circle of precisely tolerance diameter, has traditionally demanded an expensive lath turning, with the raw material typically starting as a forged billet or a forged ring. Since quantities of forgings are usually limited in this highly specialized industry, specially ordered forgings or castings have been economically inappropriate. In large sizes, 12 inch diameter or larger, the product cost rises to an unacceptable level, and in very large sizes, 24 inch diameter or larger, the availability of open time on large lathes becomes an obstacle.

Welding tool holders having gear trains between the electric motor armature and the propulsion reaction point, and with backlash at the chain or gear tooth propulsion element, accumulate large total back-lash, particularly since the motor gear box frequently has five or more stages of gears. The total back lash unloads as the welding tool holder moving around a pipe traverses from a climbing torque against gravity to a reverse braking torque with gravity. The change in torque from positive to negative is accompanied by an uncontrolled momentary change in speed and displacement. This is a critical anomaly in the physics of a welding arc, causing poor quality weld easily quantified by a welding monitor or identified by the naked eye. This sudden torque reversal and the subsequent change of travel speed is herein called "lurch". The term includes a mechanical or electrical backlash occasioned by passing from positive (propulsive) to negative (braking) phases of the machine or the reverse.

U.S. Pat. No. 3,456,555 patented Jul. 22, 1969 by L. E. Dunlap describes a guide for cutting tools having a flexible rubber guide track, triangular in cross section, attached to the top surface of the workpiece. A tool carriage has a first idler wheel and a second idler wheel on one side of the tool carriage. The second wheel is spaced apart and tandem on the guide track from the first wheel. A third idler wheel configured to roll directly on the top surface of the workpiece is mounted on the other side of the carriage lateral to the first and second wheels. Each of the first and second wheels has a circumferential groove in which the side walls of the groove fit the angled side walls of the top of the track. The tool is mounted on the carriage between the first and the third wheel.

U.S. Pat. No. 3,476,161 patented Nov. 4, 1969 by L. E. Dunlap describes a guide for a saw blade. A plate is mounted horizontally on the top surface of the work piece. A first idler wheel having a circumferential groove rests on a track mounted on the plate adjacent to a first side of the saw blade. The saw blade extends below an edge of the plate for cutting the work piece as the first wheel is moved along the track. The walls of the groove contact the track laterally to the length of the track. A drive motor for the saw extends laterally from the second side of the saw blade. An outrigger arm extends from the motor, laterally past the first idler wheel to a bracket that is mounted on the plate and is spaced from the first idler wheel. A second idler wheel that is mounted on the end of the idler arm distal from the first idler wheel bears upwardly against a downward facing surface of the bracket, the downward facing surface being spaced upward from the plate. The first idler wheel is forced down against the track by force of gravity by the weight of the motor wherein the track is the fulcrum pivot between the motor spaced from one side of the track and the bracket spaced from the other side of the track.

U.S. Pat. No. 3,259,021 patented Jul. 5, 1996 by J. S. Appleton et al. describes a carriage mounted on a rigid, elongate, flat ribbon track by first and second rollers each having an annular, parallel wall groove rolling on one edge of the track. The first and second rollers are held against the track by a third roller having an annular, parallel wall groove on the opposite edge of the track between the first and second rollers in staggered three point contact with the track. The first and second rollers are mounted on a first truck that is attached to the carriage by a pivot between the first and second rollers that is parallel on its axis to their axis. In another arrangement the first and second rollers on the pivoted truck are opposed by third and fourth rollers mounted on a second truck that is mounted on the carriage by a pivot between the third and fourth rollers that is parallel on its axis to their axis. The first and second rollers are drawn to the rigid ribbon track by force applied across the track through the pivots.

SUMMARY OF THE INVENTION

It is one object of the invention to provide a system for moving a tool holder carriage over a predetermined course on circular, non-circular, curved, reverse-curved, flat, and other variable geometry workpieces.

It is another object to provide a system for moving an automatic welding module over a predetermined course over a variable geometry workpiece.

It is another object that the system precisely limits lateral movement of the holder from the predetermined course.

It is another object that the system operates on a rigid track having an elastic surface.

It is another object that the system includes a guide track that is flexible in both beamwise bending and torsionally, to a degree that will permit the user to simply and directly bend or torsionally deflect the guide track to match the geometry of the workpiece.

It is another object to provide a flexible guide track and tool holder carriage drive which engages the drive track in which the drive track can be spliced end to end in any length of track greater than a predetermined minimum sufficient to form the track in a closed loop.

It is another object of the invention to provide a simple splice which allows sections of the guide track to be assembled end-to-end.

It is another object that ends of the splice are longitudinally slidable within one another.

It is another object that the splice structure is economical, withstands deflection forces from rolling elements of the system while it maintains tracking accuracy.

It is another object that the system provides easy and economical attachment so that it configures to variable geometry surfaces.

It is another object that the system may be conformingly attached to surfaces by welded stand-offs, magnets, and pneumatic cups.

It is another object that the system moves the tool holder carriage without lurch.

It is another object to impose a relatively high unit loading between the tool holder carriage and the supporting track, and that the loading be essentially constant regardless of gravity and supporting structure resilience or flexibility.

It is another object that the tool holder carriage is easily removable from the track.

It is another object that the track is easily removable from a work piece.

It is another object that the carriage includes a first motor-driven roller which rolls over the front of the track and meshes with longitudinal parallel ridges having oblique walls, and the carriage includes a second roller which rolls on the back of the track and is spring biased toward the first roller and is not restricted from lateral movement by the back of the track at the tangency of the second roller with the track.

It is another object that the axis of rotation of the second roller as the second roller rolls on the track is parallel to the axis of the first roller as the first roller rolls on the track.

It is another object that the axis of rotation of the second roller as the second roller rolls on the track is parallel to the axis of the first roller as the first roller rolls on the track, and that the second roller also is mounted rotatably on the same axis as the axis of rotation of the first roller.

A tool guide system includes a longitudinal track having a front and a back, a carriage adapted for holding a tool, a first wheel having a first axis, mounted on the carriage and disposed on the front of the track for moving along the track.

The first wheel and the track include meshed ridges and grooves oriented longitudinally with the track at the tangency of the first wheel with the track. The track is elastic at the tangency of the first wheel with the track.

A second wheel having a second axis is connected to the carriage.

The tool guide system includes means for urging the second wheel toward the first wheel. The second wheel applies force on the back of the track toward the first wheel.

In various arrangements of the invention:

The back of the track receiving the second wheel is generally flat.

The track at the tangency of the second wheel with the track does not restrict lateral movement of the second wheel on the track.

The track is tongue and groove spliced forming a continuous track through the splice of at least four parallel oblique walls for the meshed ridges and grooves on the track.

The tangency of the second wheel with the track comprises at least one leg of the tongue and groove splice.

The second wheel is mounted on the carriage so that it moves longitudinally with respect to the first wheel.

The second axis is parallel to and spaced from the first axis.

The second roller is mounted for rotation of the second axis on the same axis of rotation as the axis of rotation of the first roller.

The means for urging the second wheel toward the first wheel is elastic means which contracts along a third axis, and included is means for pivoting the second wheel on the third axis away from a straight line through the first axis and the tangency of the first wheel with the track.

The first axis and the second axis intersect the third axis.

BRIEF DESCRIPTION OF THE DRAWINGS

In order that the invention be more fully comprehended, it will now be described, by way of example, with reference to the accompanying drawings, in which:

FIG. 6 is a schematic perspective view of a closed circular guide ring track of the invention.

FIG. 7 is a schematic side view of a semicircular portion of a closed circular guide ring track of the invention.

FIG. 8 is a schematic front view of an end of the semicircular ring track of FIG. 7.

FIG. 9 is a schematic front view of an end of the semicircular ring track of FIG. 7.

FIG. 10 is a schematic front view of a portion of the semicircular ring track of FIG. 7.

DESCRIPTION OF THE PREFERRED EMBODIMENTS

Figure 1:
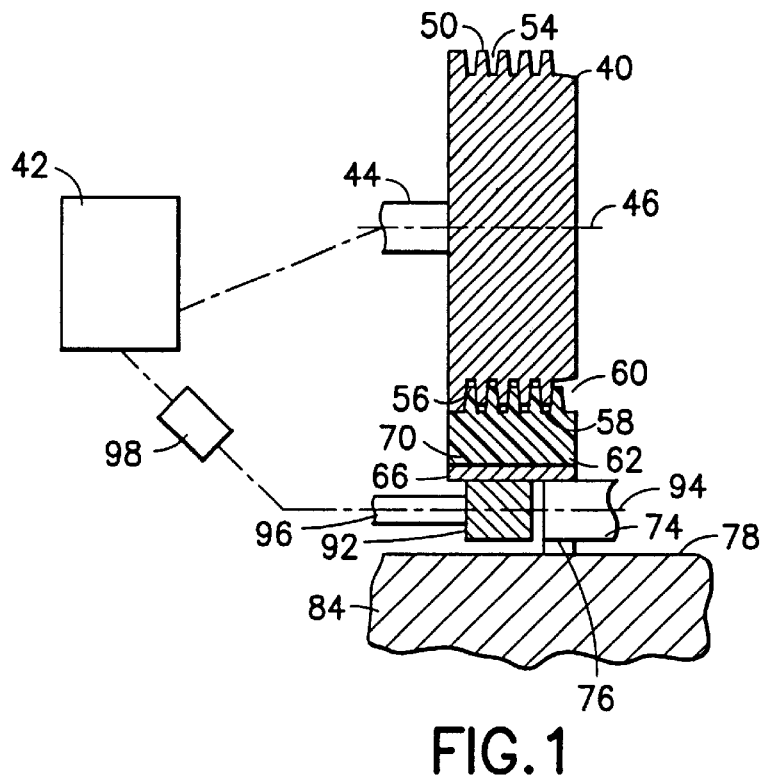
FIG. 1 is a schematic cross section view of a machine guide system of the invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Two tracks disposed with a substantial separating dimension, have a V-belt in a static position, aligned on the desired course. The ribbed surface of the V-belt is a guide upon which a grooved or ridged wheel of the tool holder carriage rolls.

The wheel is powered by electric, pneumatic, hydraulic or other motive means so as to displace the tool holder carriage along the track. Preferably the tool holder carriage has more than one grooved wheel, more than one of which is powered, and a V-belt along each track making two guide tracks.

For a relatively low load application, a single V-belt may be used in a single guide track.

The V-belt and grooved or ridged wheel may in combination have from a single groove and ridge to six or more combined grooves and ridges between them.

A brand of V-belt which has been tested to provide a high performance in the invention is Poly-V Belt tm available from Goodyear Tire and Rubber.

Preferably the included angle between the flanks of the ribs is approximately 40 degrees. Due to the angle, a multiplication of the loads at the friction surface of the rib occurs without an increase in the applied loads at the wheels of the module, a multiplication factor of approximately 3.0.

The multiplicity of vertically disposed ribs at an acute angle to the transverse plane of the workpiece provides a simple, positive guidance surface for the tool holder. The drive wheels which propel the tool holder carriage along the V-belt around or along the predetermined course are accurately positioned longitudinally and laterally on the course sufficiently to meet or exceed tolerance requirements for welding a surface of the workpiece along a predetermined line adjacent to the guided path.

A pair of thin strips of steel, aluminum, or tough plastic, say 0.125" thick and 1.25" wide, are held in axial separation by cross ties with rivets, screws or welds between the cross ties and the strips.

A V-belt is mounted on one side of the strip by bonding means such as, rivets, or screws or adhesive. The accuracy of the placement of the V-belt on the workpiece affects the accuracy of the course and therefore the accuracy of a welding line guided by the system. In the present invention placement is easily accomplished with simple tooling.

The opposite side of the strip relative to the V-belt side is a flat track for counter force bearing rollers or wheels which provide a counter force to the applied friction inducing wheel loads of the V belt and groove/ridge wheel.

Thin walled aluminum tube cross ties, preferably 1 inch square, abut the workpiece regardless of its shape. If the workpiece is a closed tube or pipe, hoop tension force applied to the strips pulls the cross ties into pressured contact with the workpiece. The unsupported length of the guide track between the cross ties is made sufficiently short so as to reduce bending deflections between the cross ties to an acceptable degree. The guide track is formed by the pipe into a guide ring.

The total guide ring assembly is in pressure contact with the workpiece and the workpiece has a specified dimensional and circulatory tolerance, the guide ring splice design accommodates the circumferential results of the tolerances. The guide track is sufficiently flexible to be clamped (hoop-tensioned) into intimate contact with the workpiece making the workpiece input its dimension and tolerance to the guide ring and tool holder carriage or welding machine that travels on the guide ring.

The multi grooves of the V-belt and rollers offers a direct means of negotiating the splice in the guide track which closes the loop of the guide track around the pipe, regardless of the adjustment configuration of the splice. This is of paramount importance in a welding setup, as the travel across this splice must not embarrass the rock steady demand of the torch placement relative to the workpiece. With a V-belt having 6 ribs and 5 grooves across its width, the splice is such that at least two ribs are in engagement with the rollers at all times. This provides a hinge area which may be necessary to open the guide ring preliminary to installation on the workpiece. By positioning the splice and the hinge on a diameter, and placing this joint at the top and bottom of the guide ring relative to gravity, the slight loss in propulsive thrust during passage across the joint is rendered unimportant.

The invention is used with circular or closed workpieces in which the guide track is hoop tensioned against the surface of the workpiece. It is also used with workpieces which are open such as a panel in which an open guide track is firmly positioned against the workpiece and attached to it by non-hoop tensioning means which include welded stand-offs, magnets, and/or pneumatic cups connected to the track.

The flexible guide ring can be shaped in the field by the customer to match the workpiece shape. The shapes can be convex with respect to the V-belt, that is, with the belt further from the radius center than the strip, or concave with the belt closer to the radius center than the strip, or with a zero bend flat track.

The invention V-belt and grooved roller imposes large friction-inducing loads resulting in significant friction damping. In addition to the friction damping, the design deliberately imposes a very large final speed reduction ratio between the electric motor gear train backlash and the grooved wheel axles. This large ratio, about 3.75 to 1, reduces all accumulated backlash upstream of the final gear set by this ratio factor. The result of these two design features is to render lurch imperceptible.

One embodiment of the present invention incorporates four grooved rollers, two of which are powered, and two are not powered. Two counter force bearings, one behind each of the two track strips are spring beam loaded against the strips and are positioned circumferentially between the grooved rollers on the front of the strips. The radial load for one application is about 200 pounds total. This arrangement performs well. However, dimensional changes to the spring beam locations are necessary when there are substantial changes in the radius of curvature of the workpiece such as for different pipe sizes. Also the imposition of high grooved roller and counter force bearing reaction loads to the flexible guide ring can result in perceptible structural bending displacements, which, in turn reduce the magnitude of the reaction load and thus the friction propulsive load. As long as these displacements are minimized by sufficient hoop tension in the guide ring, or by a rigid track, the friction propulsive load can be maintained in a usable range.

In a preferred embodiment the applied load against the strip by the counter force bearing or roller behind the strip is coincident with the load on the strip by the grooved roller in the V-grooves on front of the strip. This loading avoids extraneous bending or torsional residual loading, but more importantly it allows the mechanism to function without degradation on large changes of track radius of curvature, whether on convex or concave workpieces.

The counter force bearing comprises a plurality of wheels, one counter force wheel directly behind each grooved roller load so that the counter force wheel and the grooved roller each apply force against the track along the same axis normal to the track. The applied load is generated preferably by a mechanical clamp, loaded spring, or hydraulic or pneumatic pressure device. A preloaded compression spring has been found to be satisfactory for load imposition in the invention.

The center axis of the coiled compression spring, the axis of the groove wheel and the counter force wheel are kept in the same plane at all times so that extraneous bending loads will not flow into the guide ring structure, and so that the critical dimension between the axles of the front two wheels will remain constant.

The V-groove wheel and counter force wheel assembly is free to rotate so that the direction of loading of the two wheels on the track is normal to the track. When the track is around a pipe, the direction of loading is also along a radius of the pipe. The direction of loading is deflected only slightly by frictional drag, the deflection being countered by the drawing of the V-groove wheel and counter force wheel assembly toward one another, the direction of loading is defined herein as including the slight deflection.

The V-groove wheel and counter force wheel assembly is free to rotate so that the couple of applied force and counter force seek and hold the normal and radial position. They are free to seek without causing a servoing lock-up.

A welding module mounted on the tool holder carriage is easily and quickly installed and removed from the V-belt and strip assembly. The counter force bearing is unloaded and removed from its engaged position on the opposite side of the strip of the guide ring relative to the multi-grooved wheel of the tool holder carriage. The unloaded bearing is withdrawn with a motion parallel to its axle and by rotating with a pivotal motion, the pivot of the motion being normal to the footprint area of the bearing load and coincident with the axis of the coil spring providing the load. A preferred embodiment of the invention has a hardened pin and helical slot mechanism to effect a 90 degree rotation of the counter force bearing using the motion required to unload the coil spring.

Unloading of the counter force bearing is necessary before the bearing can be moved to allow the removal of the tool holder carriage or a welding module from the track.

In one arrangement each of 4 counter force rollers is pressed against the metal, aluminum or plastic backing strip of the V-belt by a compression spring. Each of the four springs has an opposing hydraulic load cylinder that is activated by a master cylinder that is stroked by the reaction of a ball screw that is rotated by hand wheel or electrical screw driver.

Simultaneous unloading force on the 4 springs can be applied by 4 pneumatic cylinders connected in parallel to a gas pressure source.

At the expense of losing non-manditory simultaneous action, individual mechanical overcenter clamps can be assembled to each spring; each of the 4 spring loads being removed sequentially. Alternately 4 thumb wheels on a screw thread can be used.

One embodiment utilizes spring loads of 75 pounds on each of the powered rollers and 25 pounds on each of the non-powered rollers for a total friction load of 200 pounds.

The hydraulic master cylinder/4 slave cylinder configuration incorporates a one-way valve in consort with a hydraulic toggle switch. This allows the hydraulic pressure to be retained in the system during removal of a welding module from the guide tracks and repositioning of the module back on the guide tracks without further preparatory action. Then, moving the toggle switch releases the fluid pressure and causes the 4 counter force bearings to rotate 90 degrees and then causes the return of their individual spring loads. Thus during performance of a welding function by a welding machine or other tool, the fluid pressure system is at ambient pressure and thus dormant.

Figure 2:
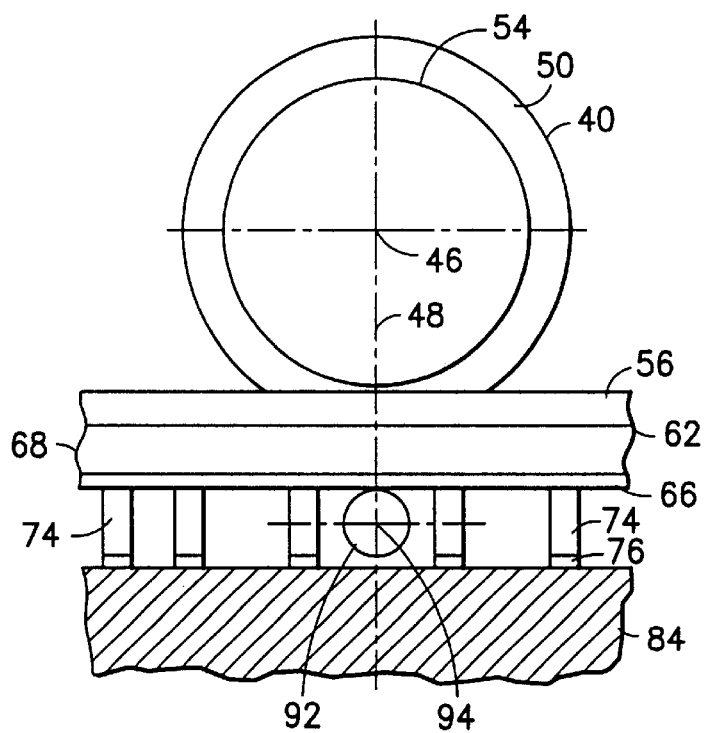
FIG. 2 is a right side schematic view of the system of FIG. 1.
Figure 3:
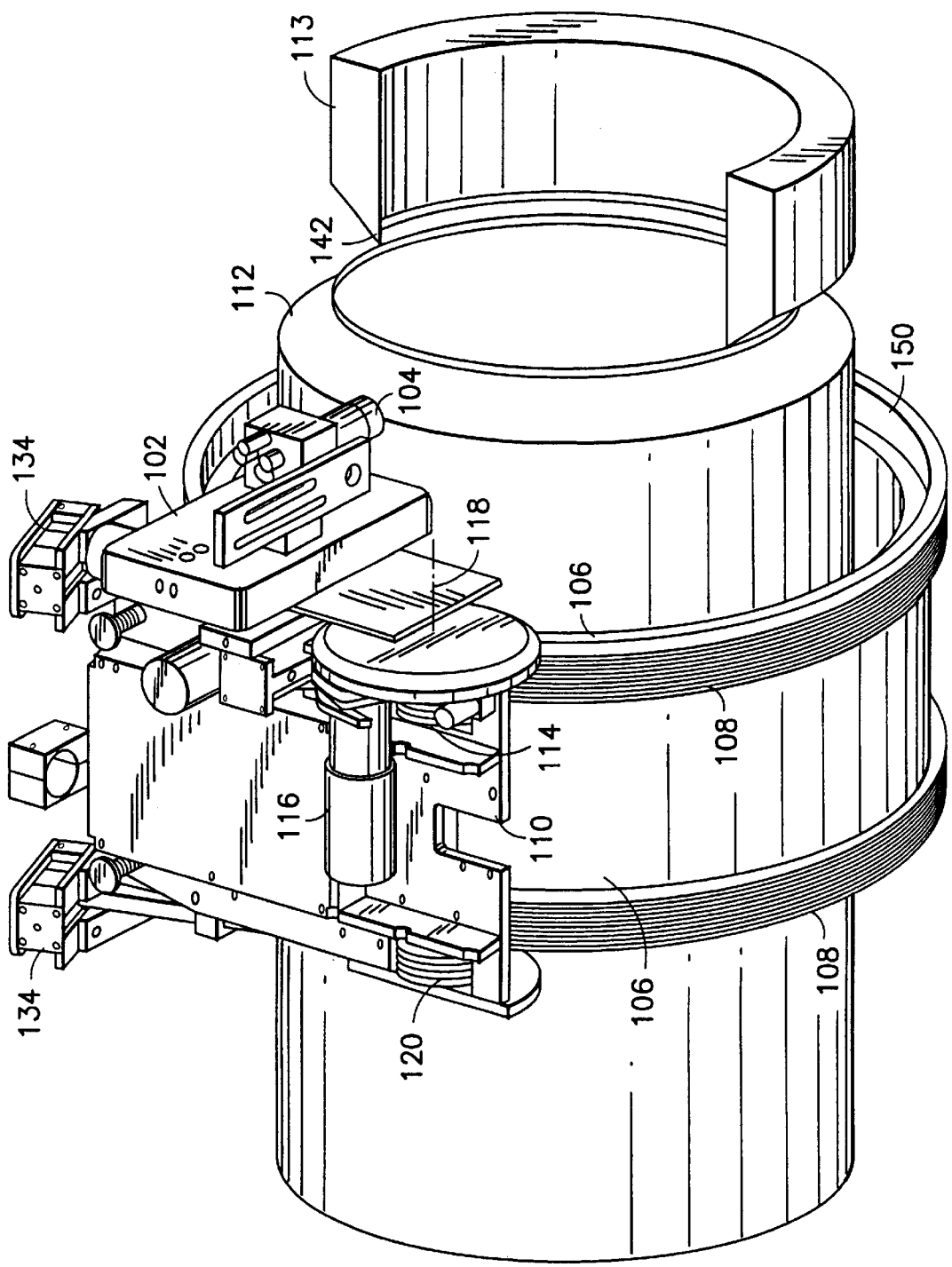
FIG. 3 is a schematic perspective view of a machine guide system of the invention holding a torch and mounted on a pipe workpiece.
Figure 4:
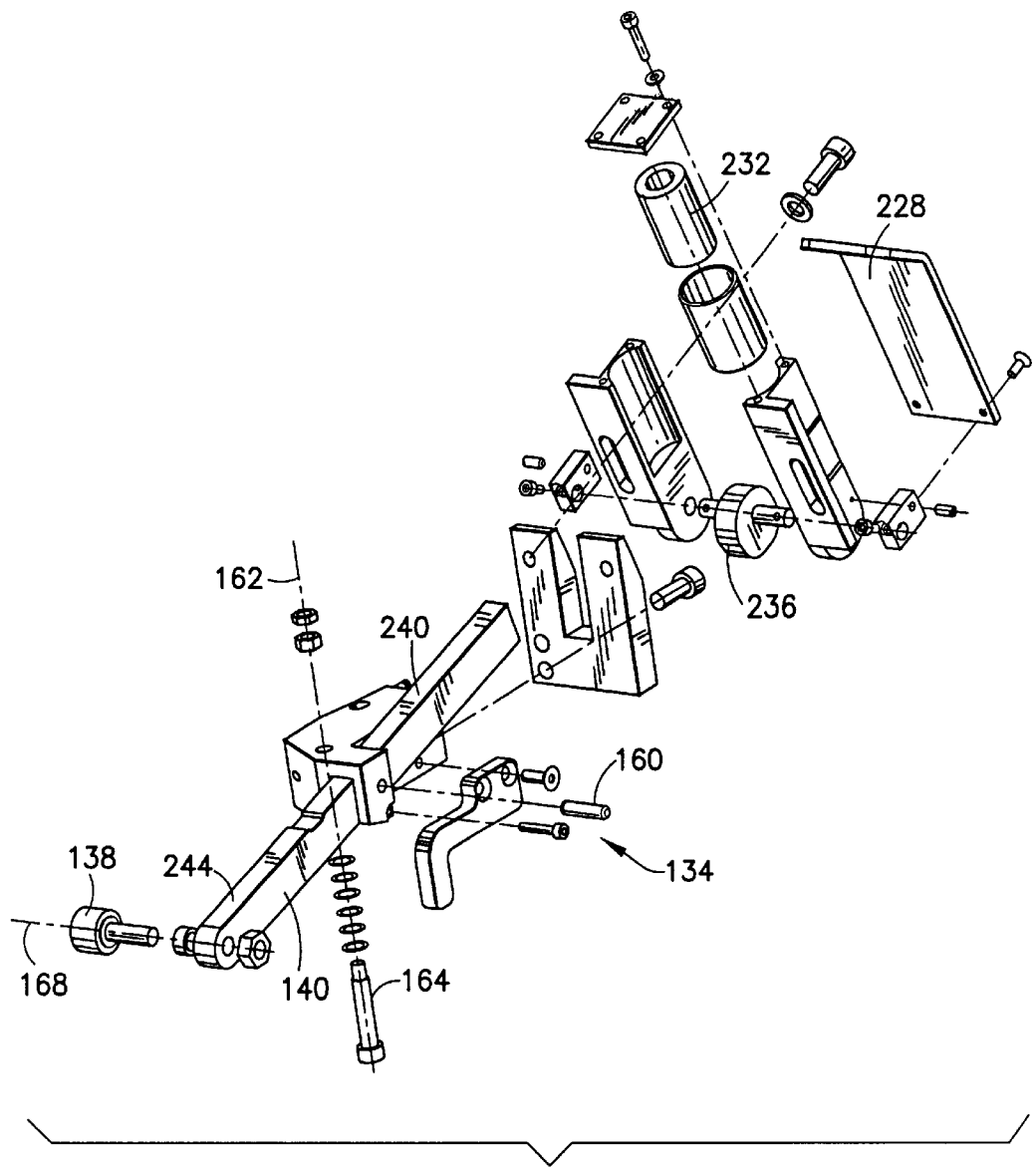
FIG. 4 is an exploded view of a beam loading device of the invention.
Figure 5:
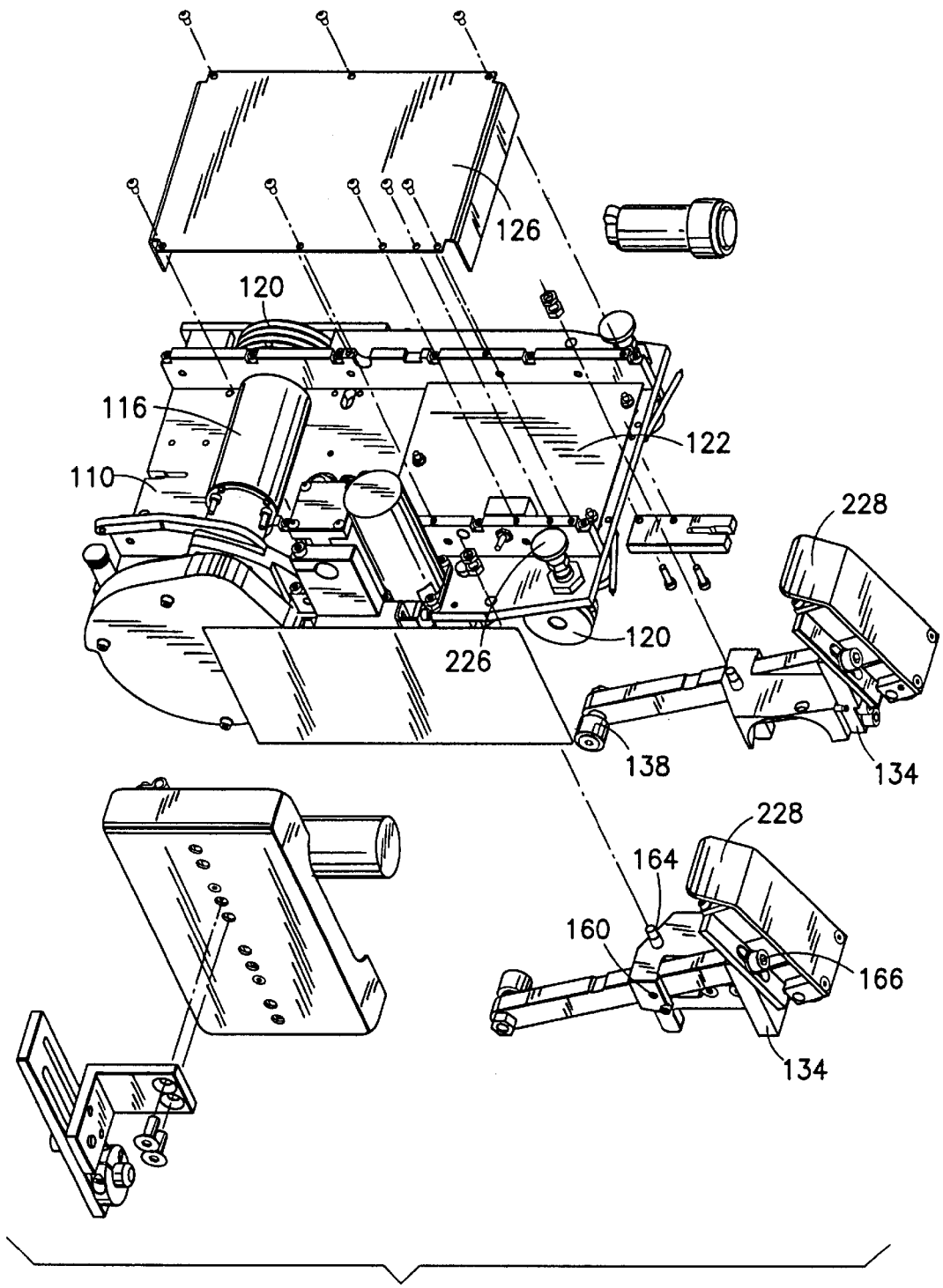
FIG. 5 is an exploded view of a tool holder carriage assembly of the invention.

In FIGS. 1 and 2 grooved or ribbed wheel 40 is driven by axle 44. Axle 44 in concert with other axles of tool holder carriage 42 is connected to and carries the weight of the tool holder carriage and any tool such as a welding head which will work upon workpiece 84. Ribs 50 and grooves 54 of wheel 40 ride in ribs 56 and grooves 58 on the front 60 of flexible, composition rubber reinforced V-belt 62.

Flexible steel strip 66 is glued or otherwise attached to the back 70 of V-belt 62. V-belt 62 and strip 66 form a flexible guide track 68 that is mounted by support 74 and attachment means 76 onto surface 78 of workpiece 84.

Flexible guide track 68 is one of a pair of guide tracks (only one is shown) which are held parallel to one another and supported on the workpiece by supports 74 that are rigid cross ties between the guide tracks 68. Attachment means 76 are magnets for attaching the flexible guide track to surface 78 so that the guide track conforms to the shape of surface 78 whether the surface be flat or curved. If the workpiece were to be a pipe, then attachment means 76 can be non-skid rubber pads, and the guide track is in the form of a closed loop with the ends drawn together as in a hoop clamp. The ends of the hoop are cut so that the opposing ends of the ridges and grooves of the V-belt are interspersed thereby providing a continuous ribbed guide track for the ridges and grooves of wheel 40. Since the grooves and ridges run lengthwise along the guide tracks, the splice can be at any place along the length of the guide tracks being spliced. This would not be so if there were gear tooth traction along the length of the guide tracks because the pitch of the gear teeth must be matched and therefore the splice would have to be at one of a plurality of points predetermined by the pitch of the gear teeth.

Counter force wheel or bearing 92 is connected to tool holder carriage 42 by axle 96. Force application means such as hydraulic or spring means 98 is connected between tool holder carriage 42 and counter force wheel 92 so that it draws counter force wheel 92 forward against strip 66 so that guide track 68 is pinched by and between grooved wheel 40 and counter force wheel 92. In a preferred embodiment of the invention axis 46 of wheel 40 and axis 94 of wheel 92 are on a line 48 that passes through guide track 68 normal to track 68. Preferably wheel 92 and wheel 40 are drawn toward one another along a line of force that passes through their tangents to the guide track normal to the guide track.

If the line that passes through axis 46 and 94 passes through guide track at an oblique angle to the guide track, or their tangencies to the guide track are spaced lengthwise along the guide track, a substantial backward force of wheel 40 countered by and forward force of wheel 92 may bend or twist the track in shear.

Referring to FIGS. 3–11, welding module 102 is mounted on closed circular flexible guide ring track 106 which has two parallel V-belts 108. Flexible guide ring track 106 is drawn about pipe workpiece 112 so that it is concentric with the pipe for welding pipe 112 to pipe 113. Weld torch head 104 is positioned over the center line of weld preparation 142.

The module comprises tool holder carriage 110 which is moved along the track by powered grooved roller 114 driven by motor 116. Tool holder carriage 110 may be an integral part of the module or may be a separate structural item having the powered roller and designed to hold the module or other tool.

Electronic control circuit 122 for the module is housed under protective cover 126.

Grooved roller 114 supports on the track, part of the weight or load of the module. Grooved roller 120 is powered and supports on the track, part of the weight or load of the module.

Beam loading device 134, using tool holder carriage 110 as a fulcrum, forces counter force roller 138 on loading beam 140 against strip 150 of flexible guide ring track 106. Roller 138 is positioned on margin 154 of the strip adjacent to and free from rotational interference from spacer ties 158. The ties are not shown in FIG. 3 for clarity of presentation.

Beam 140 pivots on pin 160 which allows pressing of counter force roller 138 against the inner surface of the guide ring track. Pivot 164 permits lateral rotation of the beam on tool holder carriage 110 so that counter force roller 138 can be moved out from behind the track. Axis 162 of pivot 164 is normal to axis 168 of roller 138 and normal to axis 118 of roller 114. Screw 166 adjusts the beam for different diameter guide rings.

Figure 11:
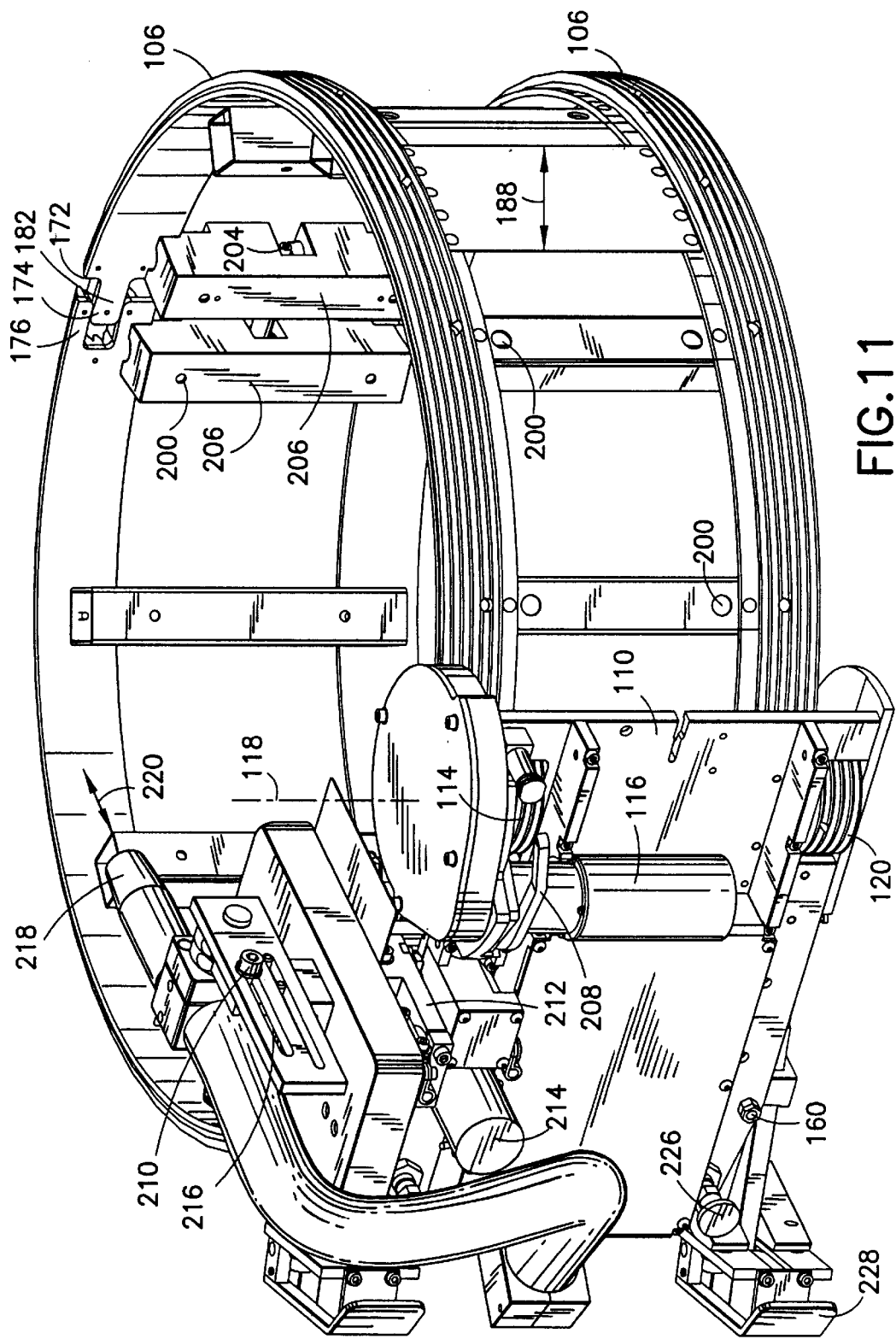
FIG. 11 is a schematic perspective view of a machine guide system of the invention holding a torch.

Circular track 106 is made from two semicircular portions 170 which are spliced at ends 174, 176, in a circumferential splice 172, shown as a tongue and groove splice in FIGS. 6, and 11. A grooved or ridged finger 182 from one end of the track extends into another end of the track so that portions of the grooves or ridges of one end are parallel and laterally adjacent to portions of the grooves or ridges of the mating end.

The two ends of the track with the tongue and groove joint slide longitudinally so that the track can be tightened into a hoop in which ridges and grooves on the track at the joint are adjacent to one another when ends 175 and 177 are spaced from one another in the tightened hoop.

The fingers are subject to bend displacement if a heavily loaded grooved wheel traverses them and the counter force roller is not directly opposite to the tangent of the grooved wheel to the track. In the preferred embodiment described earlier, bending displacement is prevented by the counter force roller supporting the finger directly behind the grooved roller.

Shear plate 188 holds the two tracks against differential lengthwise movement of one with respect to the other.

Attachment of the flexible guide track to other workpieces which may be flat or have other non-closed surface geometries may be made through holes 200.

Bolt 204 through blocks 206 draws ends 174, 176 of the circular track together. Blocks 206 may be spaced from one another so that tightening of bolt 204 draws track 106 around a pipe in a tensioned hoop.

In FIG. 11, tool holder carriage 110 comprises a precision powered slide 212 operated by motor 214 for moving torch head 218 radially 220 to the axis of circular guide ring track 106. Detent Pin 226 prevents movement of the beam about pivot 160. Radial start position of torch head 218 is set with screw 210 and slot 216.

Grooved roller 114 is driven by motor 116 which can be disengaged by moving clutch lever 208.

Hand lever 228 is used to unload the beam and rotate the counter force roller out from behind the track. Referring to the exploded view in FIG. 4, pulling the lever away and around from spring 232 rotates cam 236 which pushes pivoted loading arm 240 causing end 244 of arm 240 to move counter force roller 138 away from the track. Then the locking detent pin 226, shown in FIG. 11, is pulled and the bar is twisted around to pull counter force roller 138 out from behind the track.

Figure 12:
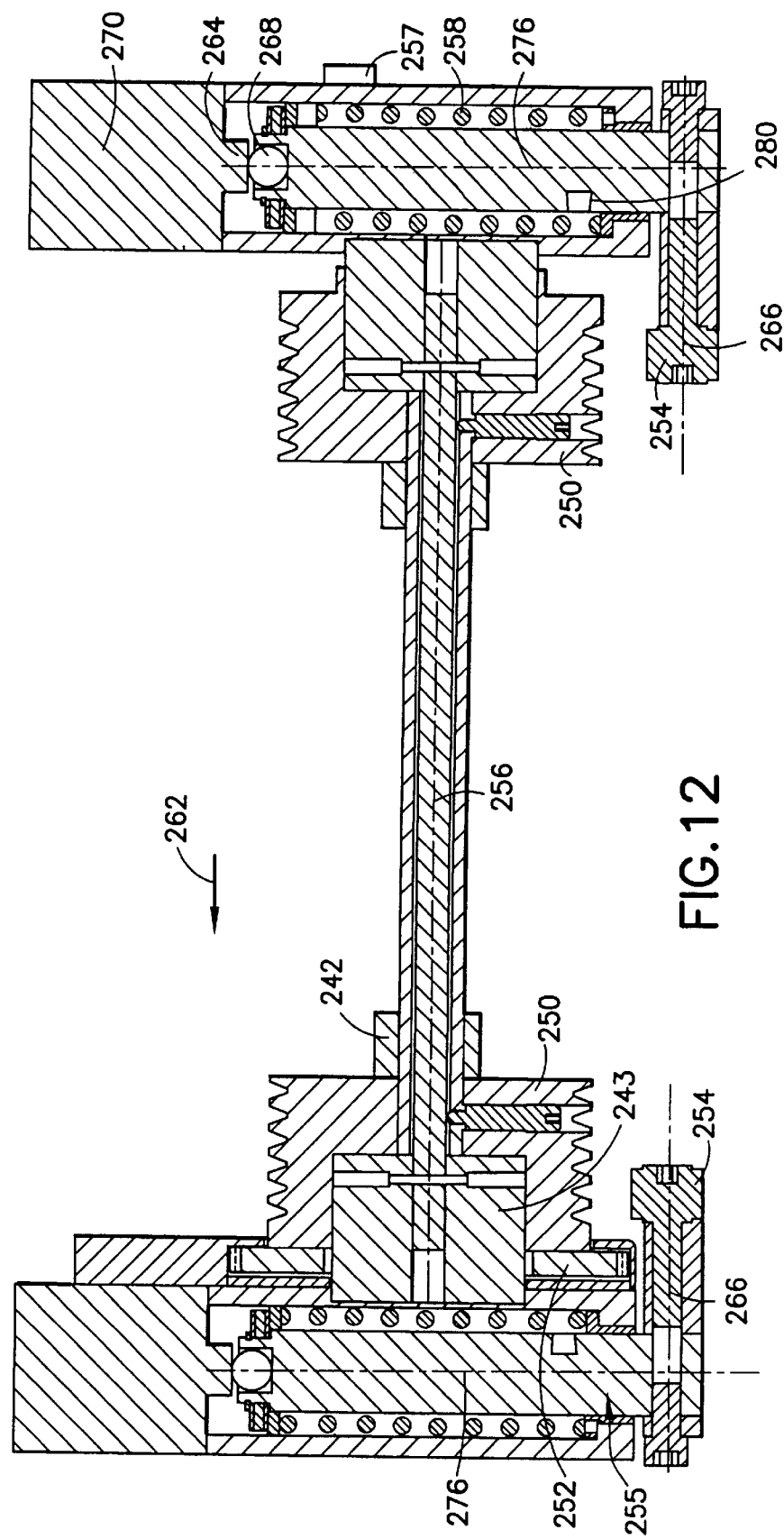
FIG. 12 is a schematic front view of a tool holder carriage of the invention.
Figure 13:
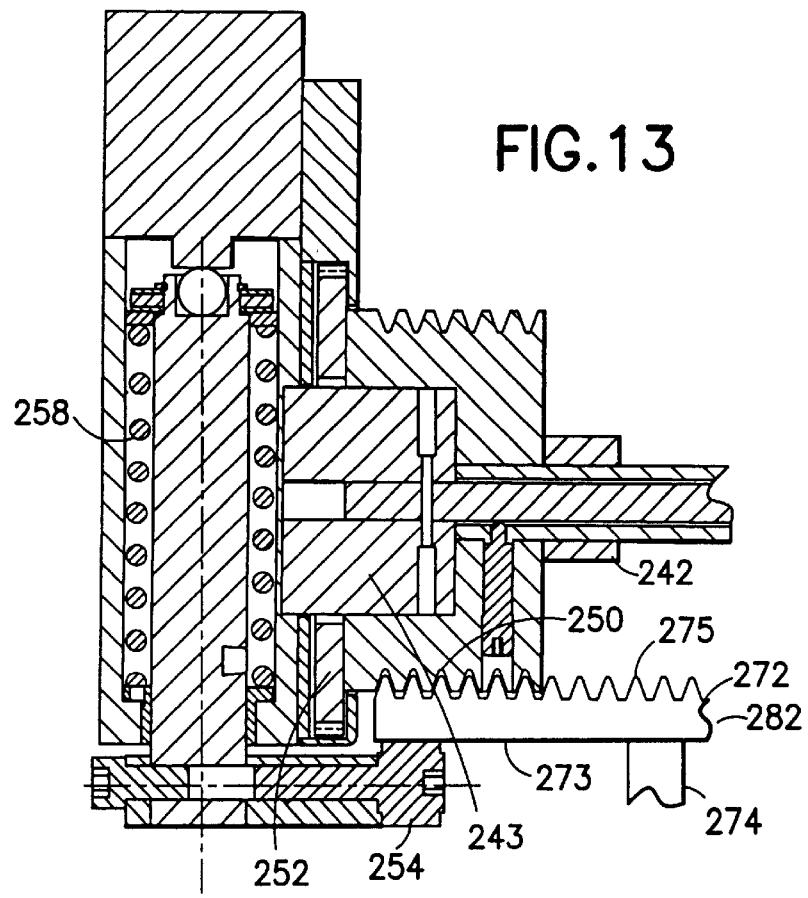
FIG. 13 is a schematic front view of one side of the tool holder carriage of FIG. 12 mounted on a guide track.
Figure 14:
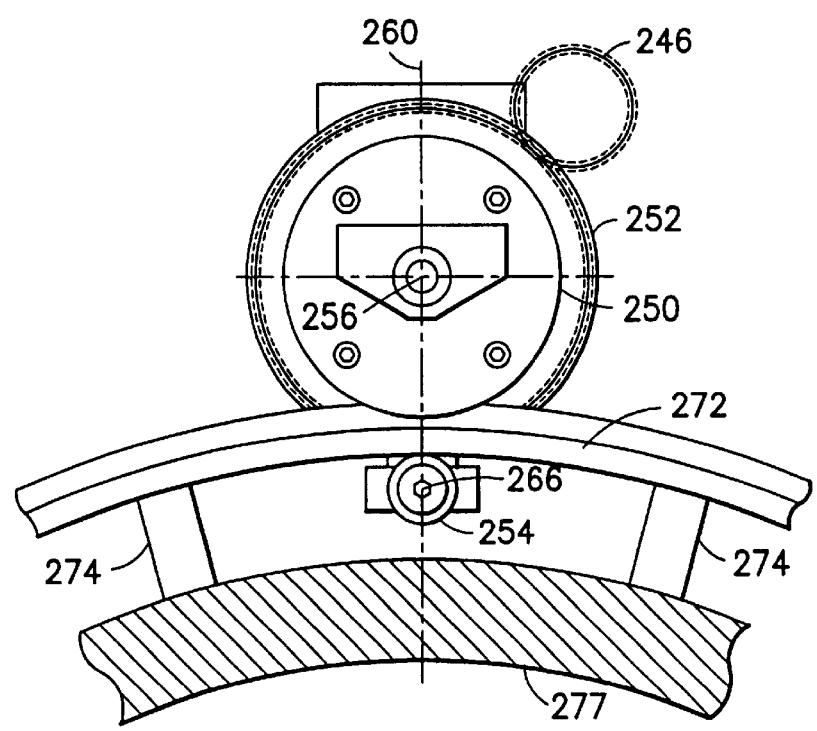
FIG. 14 is a schematic side view of the tool holder carriage of FIG. 12 viewed in direction 262.

Referring to FIGS. 12–14, grooved roller 250 which is rotated by gear 252 driven by motor 246, and counter force roller 254 are configured to pinch guide track 272 between them when the counter force roller is pulled toward the grooved roller by compression spring 258. Track 282 is made from a flexible reinforced polymer V-belt 272 which has sufficient toughness and strength for attachment to a workpiece by a plurality of spacers 274 so that a supplemental metal reinforcement strip is not included. Spacers 274 may be molded or formed as one with the belt, as strips, or as spaced posts as shown in FIG. 14. The workpiece is a pipe 277. Belt 272 is concentric with the pipe. Line 260 is a radial of the pipe.

Counter force roller assembly 255 comprising roller 254, axis 266 and axis 276, is attached to bearing 243 so that optionally assembly 255 is able to rotate on axis 256. But rotation of assembly 255 on axis 256 relative to a carriage on which assembly 255 is mounted is prevented by mechanical stop 257.

The force exerted by counter force roller 254 against guide track 282 toward grooved roller 250 on bearing 242 is along a line 260 that passes through the axis 256 of roller 250 and the axis 266 of roller 254. Line 260 is preferably normal to the guide track where rollers 250 and 254 pinch the track between them. Line 260 is preferably through the tangency of roller 254 with the back of flat surface 273 of V-belt 272. Line 260 is preferably through the tangency of roller 250 with the front grooved surface 275 of V-belt 272.

To move counter force roller 254 out from behind the powered roller, compression spring 258 is unloaded by piston 264. The piston is driven against thrust bearing 268 by force of pneumatic cylinder 270. When the compression spring force on the counter force roller is overcome by the piston, the counter force roller moves back, away from the powered roller and swings on axis 276 out from behind the powered roller with the aid of helical groove 280. Axis 276 is preferably fixed normal to axis 266 of roller 254. Axis 276 is preferably normal to axis 256 of roller 250. Axis 256, and 266 preferably intersect axis 276. Axis 256, 266, and 276 are preferably coplanar.

Figure 15:
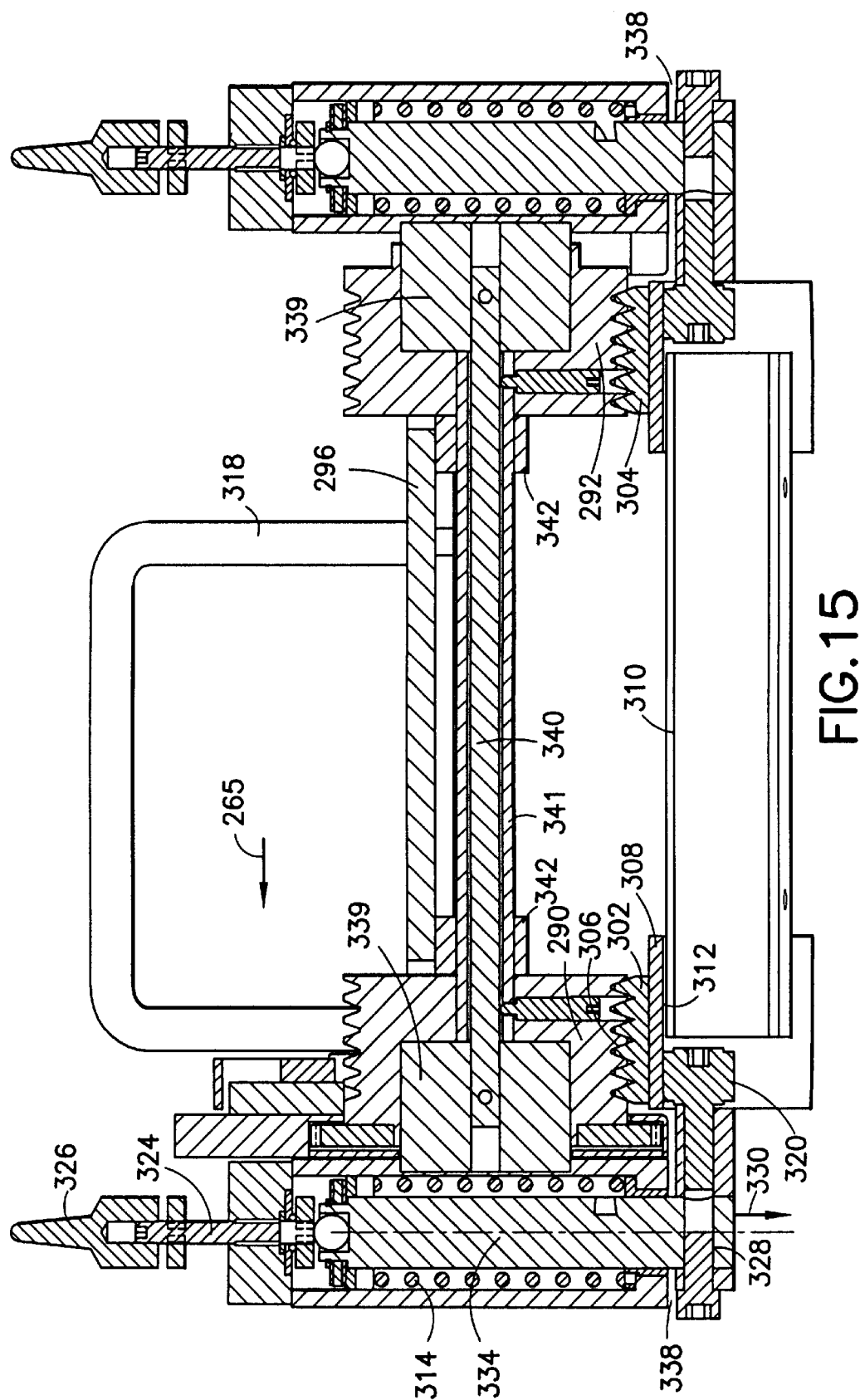
FIG. 15 is a schematic front view of a tool holder carriage mounted on a track.

Referring to FIG. 15, grooved rollers 290 and 292 of tool carriage 296 ride on rubber belt longitudinal tracks 302 and 304. The front of belt 302 has ribbed and grooved surface 306.

Roller 320 is drawn against flexible metal ribbon 308 flat surface 312 of track 302 by compression spring 314 which is mounted on carriage 296. Roller 320 is removed from track 302 by turning screw 324 that is turned by handle 326 until the screw moves axle 328 of roller 320 back 330. Then axle 328 and roller 320 rotate on axis 334 so that roller 320 is moved laterally out from behind track 302.

Counter force roller assembly 338 is attached to bearing 339 which is free to rotate in grooved rollers 290 and 292. The two counter force roller assemblies are connected by synchronization shaft 340 which runs through grooved wheel axle tube 341 allowing the assembly to rotate freely relative to the grooved wheels. The groove wheel axle tube is mounted on carriage 296 by means of bearings 342.

Tracks 302 and 304 are connected by spacer tie 310.

Handle 318 is part of the carriage.

Figure 16:
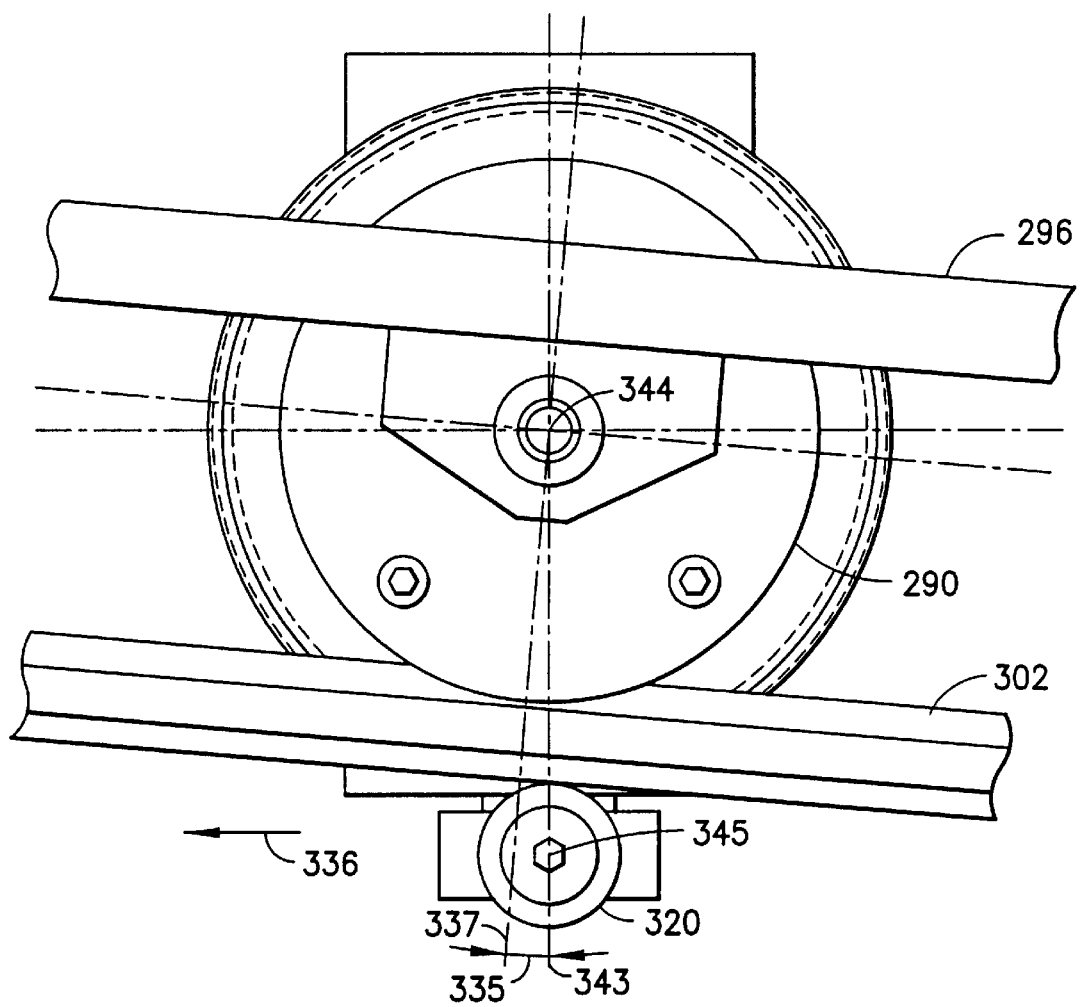
FIG. 16 is a schematic side view viewed in direction 265 of the system of FIG. 15.

Referring to FIG. 16, as carriage 296 is moved along tracks 302 in direction 336, frictional bearing loads cause a small friction angle 335 to form between a line 343 between axis 344 of grooved roller 290 and axis 345 of counter force roller 320 and normal 337 to the track. Frictional bearing loads are minimized to keep the friction angle as small as practical.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention. The terms "wheel" and "roller" are interchangeable in the specification. The term "wheel" used in the claims is herein defined to include "wheel" and "roller".

Drawing Designators (Informal)
40 ribbed wheel
42 tool holder carriage
44 axle
46 axis of wheel 40
48 line
50 rib
54 groove
56 rib
58 groove
60 front of V-belt
62 V-belt
66 strip, flexible
68 guide track
70 back of V-belt
74 support
76 attachment means
78 surface of workpiece
84 workpiece
92 counter force wheel
94 axis of wheel 92
96 axle
98 spring means
102 welding module
104 weld torch head
106 closed circular guide ring track
108 V-belt
110 tool holder carriage portion of module 102
112 pipe workpiece
113 pipe
114 powered grooved roller
116 motor
118 axis of roller 114
120 grooved roller
122 electronic control circuit
126 protective cover
134 beam loading device
138 counter force roller
140 loading beam
142 weld preparation
150 strip
154 margin
158 spacer tie
160 pin
162 axis of pivot 164
164 pivot
166 screw, adjusted
168 axis of roller 138
170 semicircular portion
174 end
175 end
176 end
177 end
172 circumferential splice
182 finger
188 shear plate
200 hole
204 bolt
206 block
208 clutch lever
210 screw
212 powered slide
214 motor
216 slot
218 torch head
220 radially, direction arrow
226 detent pin
228 hand lever
232 spring
236 cam
240 arm
242 bearing
243 bearing
244 end of arm 240
246 motor
250 grooved roller
252 gear
254 counter force roller
255 counter force roller assembly
256 axis of roller 250
257 mechanical stop
258 compression spring
260 line
264 piston
266 axis of roller 254
268 thrust bearing
270 pneumatic cylinder
272 V-belt
273 back flat surface
274 spacer
275 front grooved surface of V-belt 272
276 axis 280 helical groove
282 guide track
290 grooved roller
292 grooved roller
296 carriage
302 track
304 track
306 ribbed and grooved surface of belt 302
308 flexible metal ribbon
310 spacer tie
312 flat surface
314 compression spring
335 friction angle
336 direction arrow
337 normal
338 counter force roller assembly
339 bearing
340 shaft
342 bearing
343 line
344 axis
345 axis
318 handle
320 roller
324 screw
326 handle
328 axle of roller 320
330 back
334 axis

I claim:

1. A tool guide system comprising:
a longitudinal track having a front for receiving a carriage and a back for mounting towards a workpiece,
a carriage adapted for holding a tool,
a first wheel having a first axis, mounted on said carriage and disposed on the front of said track in contact with the front of said track for moving along said track,
said first wheel and said track comprising meshed ridges and grooves, each ridge and groove being oriented longitudinally with said track at the tangency of said first wheel with the front of said track,
said track being elastic at the tangency of said first wheel with the front of said track,
a second wheel having a second axis, connected to said carriage, disposed on the back of said track for moving along said track,
means for urging said second wheel toward said first wheel so that said second wheel applies radial force on the back of said track towards said first wheel.

2. The tool guide system of claim 1 wherein said second wheel contacts a generally flat surface of the back of said track for moving along said track.

3. The tool guide system of claim 1 wherein said track at the tangency of said second wheel with said track does not restrict lateral movement of said second wheel on said track.

4. The tool guide system of claim 1, wherein said track is tongue and groove spliced forming a continuous track through the splice of at least four parallel vertically oblique walls for said meshed ridges and grooves on said track.

5. The tool guide system of claim 4 wherein the tangency of said second wheel with said track comprises at least one leg of said tongue and groove splice.

6. The tool guide system of claim 1 wherein said second wheel is mounted on said carriage so that said second wheel moves radially with respect to said first wheel.

7. The tool guide system of claim 1 wherein said second axis is parallel to and spaced from said first axis.

8. The tool guide system of claim 1 further comprising said second wheel is mounted for rotation of said second axis around said first axis of said first wheel.

9. The tool guide system of claim 1 wherein said means for urging said second wheel toward said first wheel is elastic means which contracts along a third axis, said first axis and said second axis intersect said third axis.

10. The tool guide system of claim 1 wherein said means for urging said second wheel toward said first wheel is elastic means which contracts along a third axis, and further comprising means for pivoting said second wheel on said third axis away from a straight line through said first axis and the tangency of said first wheel with said track.

11. A tool guide system comprising:
a longitudinal track having a front for receiving a carriage and a back for mounting towards a workpiece,
a carriage adapted for holding a tool,
a first wheel having a first axis, mounted on said carriage and disposed on the front of said track in contact with the front of said track for moving along said track,
said first wheel and said track comprising meshed ridges and grooves, each ridge and groove being oriented longitudinally with said track said meshed ridges and grooves comprising walls oblique to the radial plane of said first wheel at the tangency of said first wheel with the front of said track,
a second wheel having a second axis, connected to said carriage, disposed on the back of said track for moving along said track,
means for urging said second wheel toward the back of said track so that said second wheel applies radial force on the back of said track towards said first wheel.

12. The tool guide system of claim 11 wherein said track at the tangency of said second wheel with said track does not restrict lateral movement of said second wheel on said track.

13. The tool guide system of claim 11 further comprising:
said first axis, the tangency of said first wheel with said track, and the tangency of said second wheel with said track, intersecting a first straight line.

14. The tool guide system of claim 13 wherein said means for urging said second wheel toward the back of said track is configured so that said second wheel applies force consistently along said first straight line when said carriage is moved along said track.

15. The tool guide system of claim 13 wherein said means for urging said second wheel toward the back of said track is configured so that the force applied by said second wheel is consistently along said first straight line when said carriage is moved along said track formed in an arc.

16. The tool guide system of claim 13 wherein said means for urging said second wheel toward the back of said track is configured so that the force applied along said first straight line by said second wheel is consistently normal to said track when said carriage is moved along an arc in said track.

17. The tool guide system of claim 13 wherein said means for urging said second wheel toward the back of said track is elastic means which contracts along a third axis, said first axis and said second axis intersect said third axis.

18. The tool guide system of claim 17 comprising means for pivoting said second wheel on said third axis, away from said first straight line.

19. The tool guide system of claim 13 comprising means for pivoting said second wheel away from said first straight line.

20. The tool guide system of claim 11 wherein said means for urging said second wheel toward the back of said track is elastic means which contracts along a third axis, said first axis, said second axis and said third axis being coplanar.

21. The tool guide system of claim 11 wherein said track is tongue and groove spliced forming a continuous track through the splice of at least four parallel vertically oblique walls for said meshed ridges and grooves on said track.

22. The tool guide system of claim 21 wherein the tangency of said second wheel with said track comprises at least one leg of said tongue and groove splice.

23. A tool guide system comprising:
- a longitudinal track having a front for receiving a carriage and a back, mounted on a tubular element encircling the tubular element around the axis of the tubular element with the back towards the tubular element,
- a carriage adapted for holding a tool,
- a first wheel having a first axis, mounted on said carriage and disposed on the front of said track in contact with the front of said track for moving along said track,
- said first wheel and said track comprising meshed ridges and grooves, each ridge and groove being oriented longitudinally with said track at the tangency of said first wheel with said track,
- a second wheel having a second axis, connected to said carriage, disposed on the back of said track for moving along said track,
- means for urging said second wheel toward the back of said track so that said second wheel applies force on the back of said track toward said first wheel,
- means for holding said track concentric with the circumference of the tubular element, said track being tongue and groove spliced forming a continuous hoop track of a plurality of vertical walls for said meshed ridges and grooves.

24. The tool guide system of claim 22 wherein said first axis, the tangency of said first wheel with said track and the tangency of said second wheel with said track, intersect a first straight line.

25. The tool guide system of claim 24 wherein the first straight line is along a radial of the hoop track.

26. The tool guide system of claim 24 wherein the first straight line is along a radial of the tubular element.

27. The tool guide system of claim 23 wherein the tangency of said second wheel with said track comprises at least one leg of said tongue and groove splice.

28. The tool guide system of claim 23 wherein said second wheel is mounted on said carriage so that said second wheel moves longitudinally with respect to said first wheel.

29. The tool guide system of claim 23 wherein said second axis is parallel to and spaced from said first axis.

30. The tool guide system of claim 29 further comprising said second wheel is mounted for rotation of said second axis around said first axis of said first wheel.

* * * * *

UNITED STATES PATENT AND TRADEMARK OFFICE
CERTIFICATE OF CORRECTION

PATENT NO. : 6,244,189 B1
DATED : June 12, 2001
INVENTOR(S) : Theodore C. Kingsley Page 1 of 1

It is certified that error appears in the above-identified patent and that said Letters Patent is hereby corrected as shown below:

<u>Title page,</u>
INID [75], change "Theodore C Kingsley, E. Granby" to -- Theodore C. Kingsley, Granby --
INID [73,], change "Granby" to -- E. Granby --

<u>Column 16, claim 24,</u>
Line 7, change "22" to -- 23 --.

Signed and Sealed this

Nineteenth Day of March, 2002

Attest:

JAMES E. ROGAN
*Director of the United States Patent and Trademark Office*

*Attesting Officer*